Dec. 21, 1926.

I. G. ALEXANDER 1,611,851

AUTOMATIC GREASE AND OIL FEED

Filed Oct. 22, 1925    2 Sheets-Sheet 1

INVENTOR
IRVAN G. ALEXANDER
BY J.H. Weatherford
ATTORNEY

Dec. 21, 1926.　　　　　　　　　　　　　　　1,611,851
I. G. ALEXANDER
AUTOMATIC GREASE AND OIL FEED
Filed Oct. 22, 1925　　　2 Sheets-Sheet 2
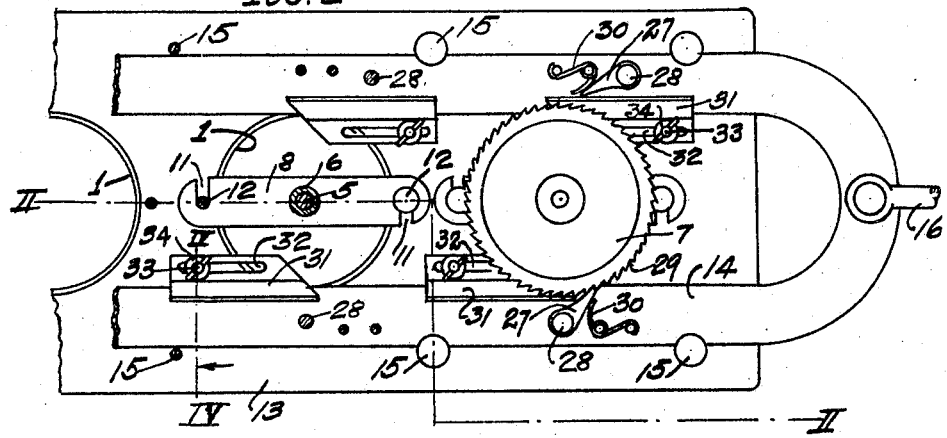
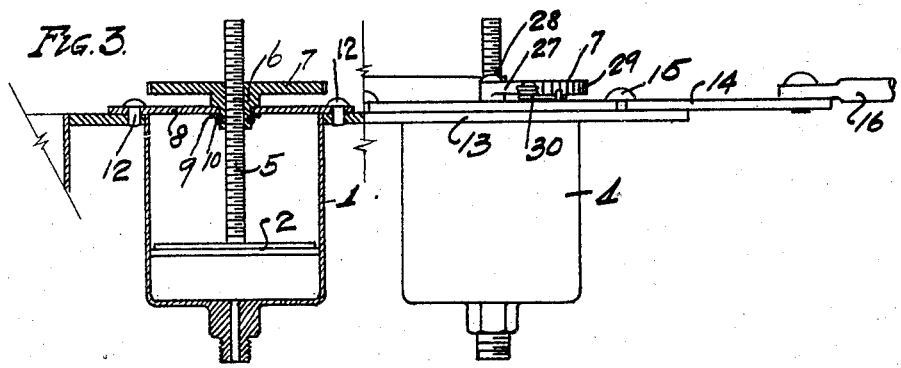
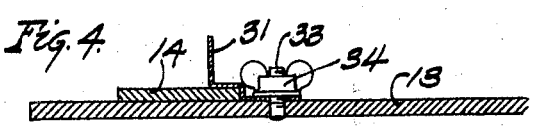
INVENTOR.
IRVEN G. ALEXANDER.
By J.H. Weatherford
ATTORNEY.

Patented Dec. 21, 1926.

1,611,851

UNITED STATES PATENT OFFICE.

IRVEN G. ALEXANDER, OF MEMPHIS, TENNESSEE.

AUTOMATIC GREASE AND OIL FEED.

Application filed October 22, 1925. Serial No. 64,091.

This invention relates to power-operated means for forcing oil or grease from a number of grease cups, at one or separate locations, to machine bearings, and has especial reference to means for regulating flow from each individual cup to its connected bearing.

The objects of my invention are,

First: to provide a reducing mechanism by which a drive for the feed may be taken from a line shaft or other rotating member, and sufficiently reduced to furnish a slow drive to operate the cup feeds;—

Second: to provide means for independently regulating the feed from each cup; and, Third: to improve the details of construction of such a mechanism, whereby the parts may be easily accessible for adjustment and other purposes, and removable to permit filling the cups.

I accomplish these objects as will be more fully hereinafter set out in the drawings, specification and claims.

In the drawings:

Fig. 2 is a plan view showing a portion of an oiler unit, with the ratchet gears and portions of the mechanism of the oilers at the left of the figure removed.

Fig. 3 is a front elevation and section of the device taken on the line II—II of Fig. 2.

Fig. 4 is a section on the line IV—IV of Fig. 2, showing an enlarged section of a regulating guard.

Figure 1:
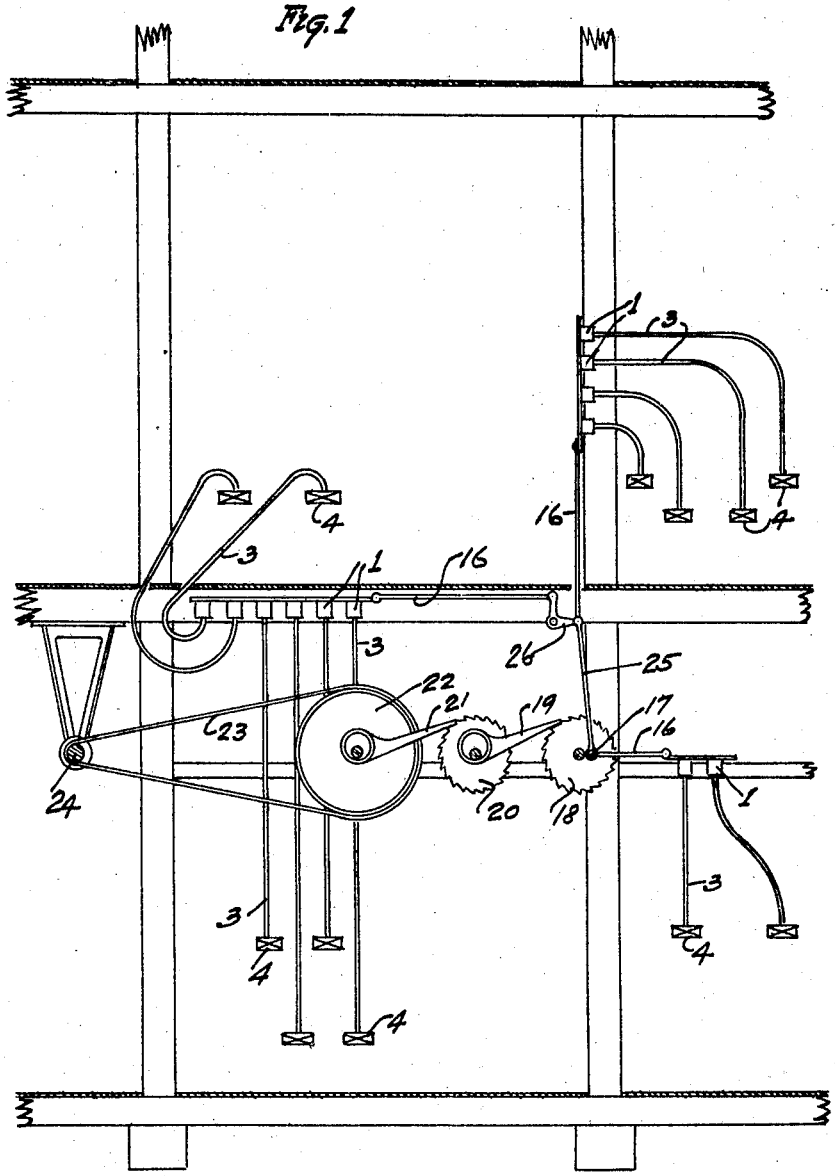
Fig. 1 is a diagramatic view of a portion of two floors of a building, showing a reducing drive and connections therefrom to three batteries of cups, one of which is located on the upper and the others on the lower floors, and also showing the connection from the cups to the individual bearings.

Referring now to the drawings, in which the various parts are indicated by numerals, 1—1 are grease, or oil, cups from which the grease, or oil, is adapted to be forced by plungers 2, through pipes 3, to bearings 4, shown diagrammatically in Fig. 1. Each plunger 2 is carried by a threaded stem 5 which engages the threaded hub 6 of the ratchet gear 7. The hub 6 of these gears extends downward through a hole in a securing plate 8, and is held in place in the plate by a washer 9 which is secured by a split ring 10, thus rotatably securing the gear 7 to the plate 8. This plate has a notch 11 at each end, which notches are adapted to embrace pins 12, which pins 12 hold the plate 8 against a base plate 13, through which plate the cups 1 are also secured.

Slidably mounted on the base plate 13, is a parallel-sided yoke 14, which is guided, and held against the plate 13, by headed bolts or rivets 15. The yoke 14 is reciprocated by a connecting-rod 16, which extends, directly or indirectly, to a pin 17 on a ratchet gear 18, the gear 18 being driven by a ratchet pawl 19, which is reciprocated by a second ratchet gear 20. This second ratchet gear in turn is actuated by a pawl 21, reciprocated by a belt pulley 22, which may be driven by a belt 23, from some rotating part such as the line shaft 24. In case the connecting-rod 16 is remote from, or out of line with, the pulley 18, it may be driven by an auxiliary rod 25, acting through a bell-crank lever 26.

The yoke 14 carries two pawls 27 for each ratchet gear 7, each of which pawls is secured on a headed pin 28 secured to the yoke 14. Each of these pawls is adapted normally to be held in engagement with the teeth 29 of the ratchet wheel 7 by means of a spring 30, so that when the yoke is reciprocated by the connecting-rod 16, the pawls 27 alternately engage the ratchet teeth and rotate the ratchet wheel. The amount of rotation which each pawl normally causes, is governed by the length of stroke which the yoke 14 makes, each pawl ordinarily giving an equal amount of such rotation. 31 are regulating guards which may be adjusted forward to such position as to prevent the pawls 27 from engaging the teeth at all, and from such forward position, they may be shifted backward to permit the engagement of one or more teeth up to the full number covered by the strokes, each of these guards 31 for each cup being independently adjustable. 32 are slots in the guards 31. 33 are bolts secured to the plate 13, each passing through a slot, and 34 nuts by which each guard may be clamped, when the adjustment is made.

It will of course be understood that similar pawls and guards are provided for each of the cups, and while two cups only are shown in Figs. 2 and 3, and the third indicated, that any number desired may be connected in one battery or unit, and that any desired number of the batteries or units may be connected up to a single reducing drive.

It will be further understood that the reducing drive shown is typical only and that other forms of reducing drive may be used, and that many of the details shown are also typical.

The action of the device is as follows: The shaft 24 drives the pulley 22 through the belt 23, reciprocating the pawl 21 and advancing the ratchet wheel 20 one tooth at a time. The wheel 20 reciprocates the pawl 19 and advances the ratchet wheel 18 one tooth at a time, thus giving an extremely slow reciprocating motion to the connecting rod 16, which rod reciprocates the yoke 14, carrying with it the actuating pawls 27. Now assuming, for example, that the stroke of the yoke 14 is such as to move the pawls 27 a space of four teeth on each side of the center lines of the respective ratchet wheels 7, this movement of the yoke 14 will advance each gear wheel eight teeth on the forward and eight teeth on the return movement, thus turning the threaded hub by this amount relatively to the threaded stems 5, forcing these stems and plungers 2 downward a proportionate amount, and forcing out a corresponding amount of grease or oil through the opening in the bottom of the cups and through the tubes 3 to the respective bearings. Should this give an excessive amount of feed, each guard 31 may be shifted so as to hold its pawl out of engagement with the teeth 29 for such proportion of the stroke as may be desired, thus cutting out all or any desired number of the teeth on one side, and all but one of any desired number on the other side, of any one of the ratchet wheels 7, each individual wheel of course being regulated as may be desired.

It will thus be seen that any feed, from one tooth up to the full number covered by the complete stroke of the yoke, may be cut in, and a very close regulation of the feed be obtained.

When the grease has been exhausted from any cup, the securing plate 8 may be shifted to release it, and the gear and plunger assembly may be withdrawn and the cup be filled. The gear may then be run down on the stem 5, the assembly be replaced and connected up, the plunger be replaced in the cup, and the feed be again reset.

It will be distinctly understood that various modifications in the details of construction may be made, and that the particular individual cup feed may be used with the type of reducing mechanism shown, or any other suitable type thereof.

Having now fully described my invention, what I claim and desire to secure by Letters Patent in the United States is:—

1. In an oiler system, the combination with a plurality of cups, jointly-operable means for forcing grease from said cups, and individual regulating means for each cup-feed, of a speed-reducing drive adapted for actuation from a rotating member, comprising a pulley, a belt adapted to drive said pulley from said rotating member, a ratchet pawl, adapted for reciprocation by said pulley, a ratchet wheel engaged by said pawl, a second pawl adapted for reciprocation by said ratchet wheel, a second ratchet wheel engaged by said second pawl, and reciprocable connecting means to said cup feeds.

2. In an oiler system, the combination, with a plurality of cups, jointly-operable means for forcing grease from said cups, and individual regulating means for each cup-feed, of a speed-reducing drive, adapted for actuation from a rotating member, comprising a pulley, a belt adapted to drive said pulley from said rotating member, a ratchet pawl adapted for reciprocation by said pulley, a ratchet wheel engaged by said pawl, a second pawl adapted for reciprocation by said ratchet wheel, a second ratchet wheel engaged by said second pawl, and connecting means from said drive to said cup feeds.

3. In a mechanically operated oiler system, a base plate; cups secured thereto; a securing plate detachably fastened to said base plate, each of said cups having a plunger, a threaded stem for said plunger, a ratchet wheel, and an internally-threaded hub for said wheel journalled in said securing plate, said threaded hub engaging said stem; a second ratchet wheel; a yoke slidably mounted on said base plate, oppositely-disposed pawls carried by said yoke engaging the respective ones of said ratchet wheels; a slidably-adjustable regulating shield for each of said pawls; a power-driven speed-reducing drive; and connecting means from said drive to said yoke.

4. In a mechanically operated oiler system, a base plate; cups secured thereto, each cup having a securing plate detachably fastened to said base plate, a plunger, a threaded stem for said plunger, a ratchet wheel, and an internally-threaded hub for said wheel journalled in said securing plate, said threaded hub engaging said stem; a yoke slidably mounted on said base plate; pawls carried by said yoke engaging the respective ones of said ratchet wheels; a slidably-adjustable regulating shield for each of said pawls; and means for reciprocating said yoke.

5. In an oiler system, a base plate; cups secured thereto, each cup having a securing plate fastened to said base plate, a plunger, a threaded stem therefor, a ratchet wheel and an internally-threaded hub for said wheel journalled in said securing plate, said threaded hub engaging said stem; a yoke slidably mounted on said base plate; pawls carried by said yoke engaging the respective ones of said ratchet wheels; an adjustable regulating shield for each of said pawls; and means for reciprocating said yoke.

6. In an oiler system, a plurality of cups, each cup having a plunger, a threaded stem therefor, a ratchet wheel, and an internally-threaded hub therefor journalled above said cup, said threaded hub engaging said stem; a yoke slidably mounted; a pawl carried by said yoke, engaging said ratchet wheel; an adjustable regulating shield for said pawl; and means for reciprocating said yoke.

In testimony whereof I have hereunto set my name.

IRVEN G. ALEXANDER.